US008953313B2

(12) United States Patent
MacDonald

(10) Patent No.: US 8,953,313 B2
(45) Date of Patent: Feb. 10, 2015

(54) METHOD AND APPARATUS FOR ENHANCED COOLING OF MOBILE COMPUTING DEVICE SURFACES

(75) Inventor: Mark MacDonald, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 258 days.

(21) Appl. No.: 12/890,420

(22) Filed: Sep. 24, 2010

(65) Prior Publication Data

US 2012/0075787 A1  Mar. 29, 2012

(51) Int. Cl.
*H05K 5/00* (2006.01)
*H05K 7/20* (2006.01)
*G06F 1/20* (2006.01)

(52) U.S. Cl.
CPC ....................... *G06F 1/203* (2013.01)
USPC ............... 361/679.5; 361/679.49; 361/679.51

(58) Field of Classification Search
CPC . H01L 23/4093; H01L 23/427; G06F 1/1616; G06F 1/1656; G06F 1/1632; G06F 1/20; G06F 1/203; G06F 1/181
USPC .............................. 361/679.5, 679.51, 679.49
See application file for complete search history.

(56) References Cited

U.S. PATENT DOCUMENTS

| | | | | |
|---|---|---|---|---|
| 5,424,915 A * | 6/1995 | Katooka et al. | ............... | 361/695 |
| 5,694,294 A * | 12/1997 | Ohashi et al. | ............ | 361/679.48 |
| 5,704,212 A * | 1/1998 | Erler et al. | ........................ | 62/3.2 |
| 6,027,535 A * | 2/2000 | Eberle et al. | .................... | 361/690 |
| 6,038,128 A * | 3/2000 | Hood et al. | .............. | 361/679.41 |
| 6,327,144 B1 * | 12/2001 | May | .......................... | 361/679.47 |
| 6,430,042 B1 * | 8/2002 | Ohashi et al. | ............ | 361/679.49 |
| 6,459,573 B1 * | 10/2002 | DiStefano et al. | ....... | 361/679.46 |
| 6,496,369 B2 * | 12/2002 | Nakamura | ...................... | 361/697 |
| 6,529,375 B2 * | 3/2003 | Miyahara et al. | ............. | 361/697 |
| 6,542,361 B2 * | 4/2003 | Paradis | ..................... | 361/679.47 |
| 6,545,866 B2 * | 4/2003 | Katsui et al. | .................. | 361/690 |
| 6,577,502 B1 * | 6/2003 | DiStefano et al. | ....... | 361/679.46 |
| 6,678,157 B1 * | 1/2004 | Bestwick | ...................... | 361/695 |
| 6,775,135 B2 * | 8/2004 | Lo | ............................ | 361/679.48 |
| 6,799,282 B2 * | 9/2004 | Maeda et al. | ................. | 713/500 |

(Continued)

FOREIGN PATENT DOCUMENTS

| | | |
|---|---|---|
| JP | H08-263162 | 10/1996 |
| JP | 2000-223876 | 8/2000 |
| JP | 2007-066071 | 3/2007 |

OTHER PUBLICATIONS

International Search Report and Written Opinion for PCT Patent Application No. PCT/US2011/053264, mailed Mar. 28, 2012, 9 pgs.

(Continued)

*Primary Examiner* — Anthony Haughton
(74) *Attorney, Agent, or Firm* — Kacvinsky Daisak Bluni PLLC

(57) ABSTRACT

An apparatus with some embodiments is described having ducts positioned above and below a main device housing to provide cooling air flow to at least a portion of the top and bottom surfaces of the associated computing device. In some embodiments, the device is a mobile computing device. In some embodiments, air may be drawn through inlets located on at least one side of the device. The inlet air may be supplied via upper and lower air ducts to an air mover positioned on an opposite side of the device. In some embodiments, air discharged from the air mover may be supplied to a main housing of the device in which heat producing components may be located. Other embodiments are described.

15 Claims, 4 Drawing Sheets

(56) References Cited

U.S. PATENT DOCUMENTS

| | | | |
|---|---|---|---|
| 6,801,430 B1* | 10/2004 | Pokharna | 361/695 |
| 6,909,602 B2* | 6/2005 | Dietrich et al. | 361/679.08 |
| 7,218,517 B2* | 5/2007 | Wolford et al. | 361/695 |
| 7,251,139 B2* | 7/2007 | Bhattacharya et al. | 361/719 |
| 7,403,385 B2* | 7/2008 | Boone et al. | 361/692 |
| 7,606,029 B2* | 10/2009 | Mahalingam et al. | 361/700 |
| 7,843,685 B2* | 11/2010 | Beauchamp et al. | 361/679.49 |
| 7,872,864 B2* | 1/2011 | Mongia et al. | 361/695 |
| 7,885,068 B2* | 2/2011 | Seo et al. | 361/695 |
| 7,898,805 B2* | 3/2011 | MacDonald | 361/695 |
| 8,213,178 B2* | 7/2012 | Chen et al. | 361/695 |
| 8,537,548 B2* | 9/2013 | Bhattacharya et al. | 361/694 |
| 2001/0017762 A1* | 8/2001 | Ueda et al. | 361/687 |
| 2001/0023591 A1* | 9/2001 | Maeda et al. | 62/3.2 |
| 2002/0024795 A1 | 2/2002 | Bhatia et al. | |
| 2002/0027772 A1 | 3/2002 | Katsui et al. | |
| 2002/0053421 A1* | 5/2002 | Hisano et al. | 165/104.33 |
| 2002/0179286 A1* | 12/2002 | Sterner | 165/80.3 |
| 2003/0218862 A1* | 11/2003 | Dietrich et al. | 361/687 |
| 2004/0085730 A1* | 5/2004 | Lo | 361/695 |
| 2004/0114322 A1 | 6/2004 | Agata et al. | |
| 2004/0125558 A1 | 7/2004 | Distefano | |
| 2005/0013116 A1* | 1/2005 | Pokharna et al. | 361/695 |
| 2006/0120043 A1* | 6/2006 | Wolford et al. | 361/695 |
| 2006/0193113 A1* | 8/2006 | Cohen et al. | 361/687 |
| 2006/0215366 A1* | 9/2006 | Kamath et al. | 361/700 |
| 2006/0232934 A1* | 10/2006 | Kusamoto et al. | 361/697 |
| 2007/0076370 A1* | 4/2007 | Mongia et al. | 361/690 |
| 2007/0121292 A1* | 5/2007 | Ariga | 361/695 |
| 2007/0127210 A1* | 6/2007 | Mahalingam et al. | 361/700 |
| 2008/0112130 A1* | 5/2008 | Nakamura | 361/687 |
| 2008/0156004 A1 | 7/2008 | MacDonald | |
| 2008/0174957 A1* | 7/2008 | Lev | 361/694 |
| 2008/0285217 A1* | 11/2008 | Nakajima | 361/680 |
| 2010/0073867 A1* | 3/2010 | Tachikawa | 361/679.48 |
| 2010/0073874 A1* | 3/2010 | Tachikawa | 361/695 |
| 2010/0073875 A1* | 3/2010 | Suzuki et al. | 361/695 |
| 2011/0292592 A1* | 12/2011 | Senatori | 361/679.46 |

OTHER PUBLICATIONS

Office Action received for Japanese Patent Application No. 2013-528403, mailed Mar. 4, 2014, 4 pages including 2 pages English translation.

Office action received for Taiwanese Patent Application No. 100134365, mailed Jun. 27, 2014, 27 pages including 13 pages English translation.

* cited by examiner

US 8,953,313 B2

METHOD AND APPARATUS FOR ENHANCED COOLING OF MOBILE COMPUTING DEVICE SURFACES

BACKGROUND

Computer system designs often provide increased functionality in a small form factor. This poses thermal design challenges as such increased functionality is often provided by electronic components which generate thermal energy, or heat. In some designs, air movers, such as fans, are included in the housing to force air through the housing to cool the electronic components located therein. As the air moves through the housing, it comes into thermal contact with the heat generating components and passes out of the housing as heated exhaust.

In many modern mobile computing applications, mobile devices are used in locations where a desk, table or other rigid support arrangement is not available. Often users operate their mobile devices with the device situated on the user's lap, knees, or on a compliant surface such as a pillow, blanket, or cushion. Although convenient, such usage can lead to problems where air inlets, typically located on the bottom of the device, become blocked by the user's leg, knee, or the compliant surface, blocking air flow to the system. In addition, even when the device receives sufficient inlet air flow to maintain its heat-generating components within their respective operating limits, thermal energy from these components can increase temperatures of the top and bottom surfaces of the device to a point that long term use of the device can be uncomfortable for the user.

As can be appreciated, there remains a substantial need for systems and methods to reduce operating temperatures of top and bottom user-interface surfaces of mobile computing devices.

BRIEF DESCRIPTION OF THE DRAWINGS

Embodiments are illustrated by way of example, and not limitation, in the figures of the accompanying drawings in which like references indicate similar elements and in which.

DETAILED DESCRIPTION

Figure 1:
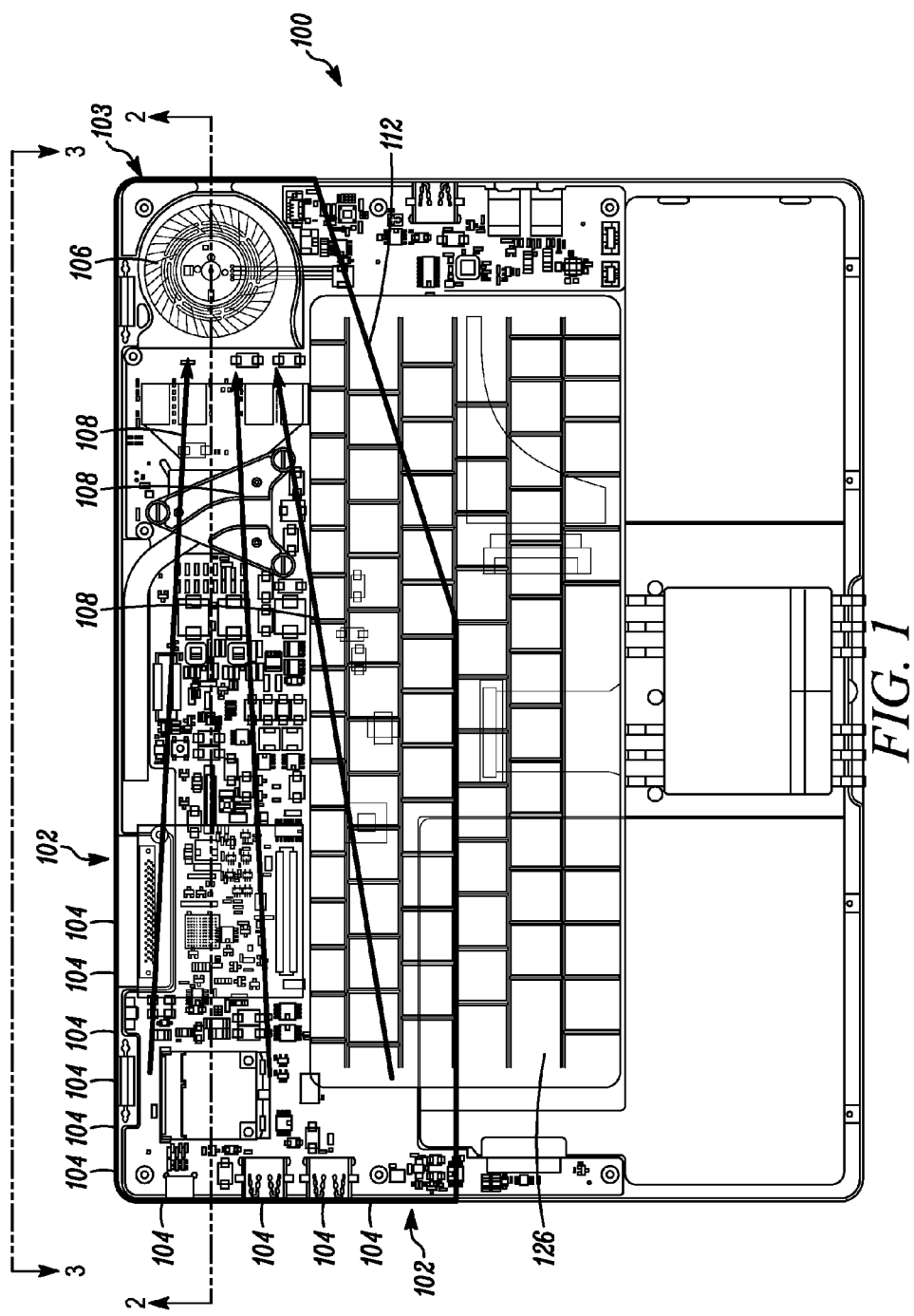
FIG. 1 is a partial cutaway top plan view of an embodiment of a device.

Users of modern mobile computing devices such as laptop computers often desire to use them outside the traditional office setting. In many instances, users operate these devices while traveling, which can require them to support the devices on the lap or knees. In other instances, users may operate these devices while sitting on a couch or chair in the home, and in such cases they may support the device on a pillow or cushion. Computing devices may have one or more heat producing components which can cause surface temperatures of the devices to rise well above ambient temperature during operation. Where such devices are supported on the user's lap or knees, long term contact with the heated bottom surface of the device can be uncomfortable. Another example of a user-interface surface is the palm rest of a device. Long term contact with a heated palm rest can also be uncomfortable.

Therefore, in various embodiments, a method and apparatus are disclosed for cooling user-interface surfaces of a mobile computing device. Other embodiments are described and claimed.

The disclosed embodiments may generally relate to a method and apparatus for reducing surface operating temperatures of mobile computing devices. One embodiment relates to an apparatus including an air duct with one or more openings. Each opening may facilitate one or more airflows into the air duct. A central housing may be provided with a heat producing component therein, the central housing positioned adjacent to the air duct. An air mover may also be provided with access to the air duct to use the air duct as an inlet. The air mover may have access to the central housing to use the central housing as an outlet.

Another embodiment relates to a computer system having a base portion with upper and lower surfaces. An air duct may be positioned adjacent one of the upper and/or lower surfaces of the base portion, the air duct having one or more openings to facilitate airflow into the air duct. A central housing may be provided with a heat producing component therein, the central housing positioned adjacent to the air duct. An air mover may be provided with access to the air duct to use the air duct as an inlet. The air mover further may have access to the central housing to use the central housing as an outlet. Still other embodiments relate to a method comprising drawing air into an air duct positioned adjacent a central housing containing one or more heat producing components of a computer system, directing one or more air flow paths through the air duct to an air mover to cool a surface of the air duct, at the air mover, receiving air from the air duct and discharging the received air into the central housing to cool the one or more heat producing components in the central housing; and exhausting heated air from the central housing through an exhaust vent. Other embodiments are described and claimed.

Numerous specific details are set forth to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

FIG. 1 is a partial cutaway plan view showing a portion of a mobile computing system 100, which, in the illustrated embodiment, is a base portion of a laptop computer. For ease of explanation, the lid portion (i.e., the portion that carries the display) is not shown. The system 100 may include a cooling arrangement in accordance with some embodiments. As illustrated, one or more sides 102 of the system 100 may be provided with one or more air inlets 104. An air mover 106 may be positioned adjacent to an opposite side of the system 103, to draw air through the air inlets 104 and across a portion of the system via air flow paths 108.

Figure 2:
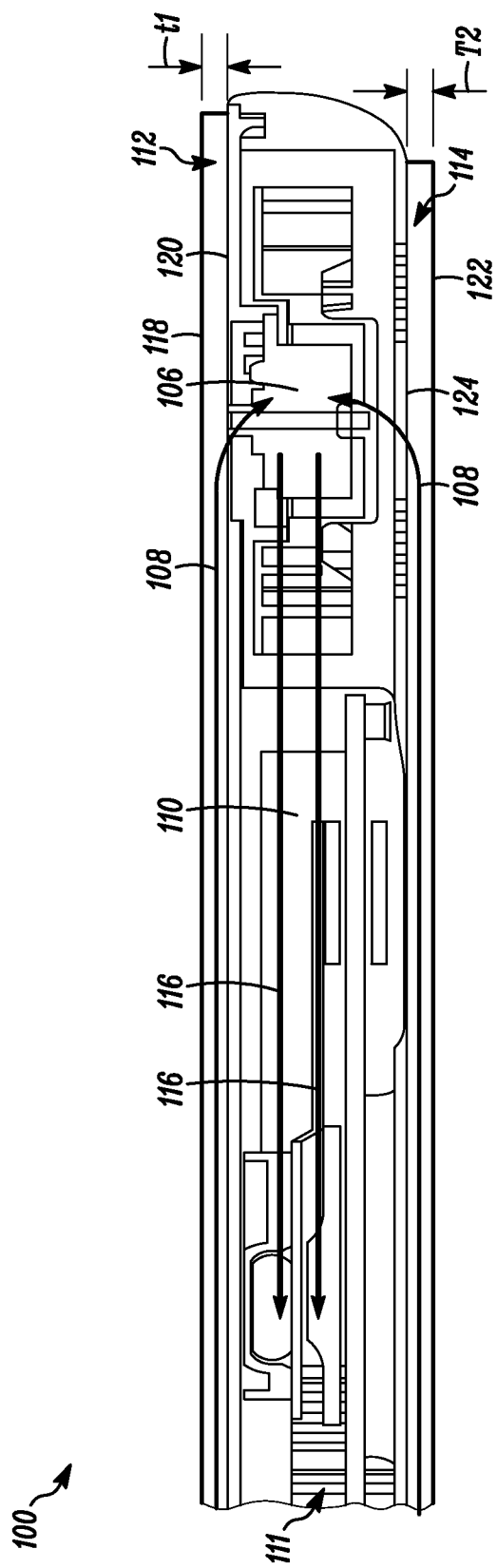
FIG. 2 is a partial cross-section view, taken along line 2-2, of the device of FIG. 1.

FIG. 2 shows a cross-section view of a portion of the system 100 in which a central housing 110 may contain a variety of electronic components which may be capable of generating heat during operation. For example, some of these components may include a processor, a hard disk drive, an optical drive, a battery cell, and the like. The air mover 106 may be positioned within the central housing 110.

The system 100 may also include top and bottom air ducts 112, 114 positioned above and below the central housing 110. These top and bottom air ducts 112, 114 may be in fluid communication with the air inlets 104 positioned on one or more sides 102 of the system 100. The top and bottom air ducts 112, 114 may also be in fluid communication with the air mover 106. Thus arranged, the air mover may draw air in through air inlets 104, causing the air to flow in the top and bottom air ducts 112, 114 along flow paths 108. Air may enter top and bottom inlets of the air mover 106, and may be discharged into the central housing 110 along flow lines 116 where it may remove heat from the electronic components located therein. Heated exhaust air is expelled through side outlets from the central housing 111.

Although the air inlets 104 are shown in FIG. 2 as being positioned on the sides 102 of the system 100, some embodiments may include air inlets positioned on one or more of the top and/or bottom surfaces of the system 100. In still other embodiments, various combinations of top, bottom and/or side surface air vents may be used.

The air mover 106 may be a single outlet blower fan with top and bottom inlets. For some embodiments, the air mover 106 may be a radial blower with a bottom inlet to draw air from the bottom. The air mover 106 may also be a straight or curved-vane caseless radial blower fan. Other types of air mover such as, centrifugal blower fan, dual outlet blower fan, squirrel cage blower fan, ionic wind (electrohydrodynamic air mover), piezo flapper air mover, synthetic jet, etc. may also be used.

As can be seen in FIG. 2, the top duct 112 may have an upper surface 118 that may be flush with a palm rest portion of the system 100 and a bottom surface 120 that may form the top of the central housing 110. The bottom duct 114 may have a lower surface 122 that may be flush with the bottom portion of the system (i.e., the surface that rests on the user's lap or knees), and a top surface 124 that may form the bottom of the central housing 110.

FIG. 2 shows the portion of the top air duct 112 that is positioned adjacent to the device's keyboard 126. As shown in FIG. 1, however, a portion of the top air duct 112 (shown in black outline) may be positioned below a portion of the device's keyboard 126. To provide the device's base portion with a substantially flat upper surface, therefore, a portion of the top air duct 112 may be angled downward so that the upper surface 118 of the top air duct 112 may fit below the keyboard 126 (FIG. 1). Such a "stepped" or angled arrangement of the top air duct 112 may provide the base portion with a substantially flat appearance while still providing the top air duct 112 with a constant thickness "t1" (FIG. 2).

In some embodiments, the top and bottom air ducts 112, 114 may be sized and configured to overlie/underlie the heat producing components of the system 100 contained in the central housing 110 (see FIG. 1). In other embodiments, the top and bottom air ducts 112, 114 may be sized and configured to overlie/underlie the entire base portion of the system. In still other embodiments, the top and bottom air ducts 112, 114 may have sizes and/or shapes that are different from each other. In one embodiment, the top air duct 112 may be sized to overlie only the palm rest portion of the device, while the bottom air duct 114 may be sized to underlie the entire bottom of the base portion of the system 100. In other embodiments, the top air duct 112 may have a thickness "t1" that is the same as, or different from, the thickness "t2" of the bottom duct 114. In further embodiments, only the top duct 112 may be provided. In other embodiments, only the bottom duct 114 may be provided.

It will also be appreciated that in some embodiments, the top and/or bottom air ducts 112, 114 may have a variable thickness "t1," "t2" across their length and/or width. Such embodiments may be used to allow for an internal "bump out" in the central housing 110 to accommodate a particularly tall component, or may be part of an overall flow distribution optimization scheme for the system 100.

Although not shown, embodiments of the top and/or bottom air ducts 112, 114 may contain internal vanes or flow dividers to provide a desired air flow path within the individual duct. Some embodiments may include more than one top air duct 112, and/or more than one bottom air duct 114.

The top and bottom air ducts 112, 114 may be formed from any chassis material known in the art. The bottom surface 120 of the top air duct 112 and the top surface 124 of the bottom air duct 114 may be formed from the sheet metal used to form the central housing 110. In some embodiments, the top and bottom ducts 112, 114 may be formed separately and attached to the central housing 110. In other embodiments, the bottom surface 120 of the top air duct and the top surface 124 of the bottom air duct may form the upper and lower surfaces of the central housing 110.

Figure 3:
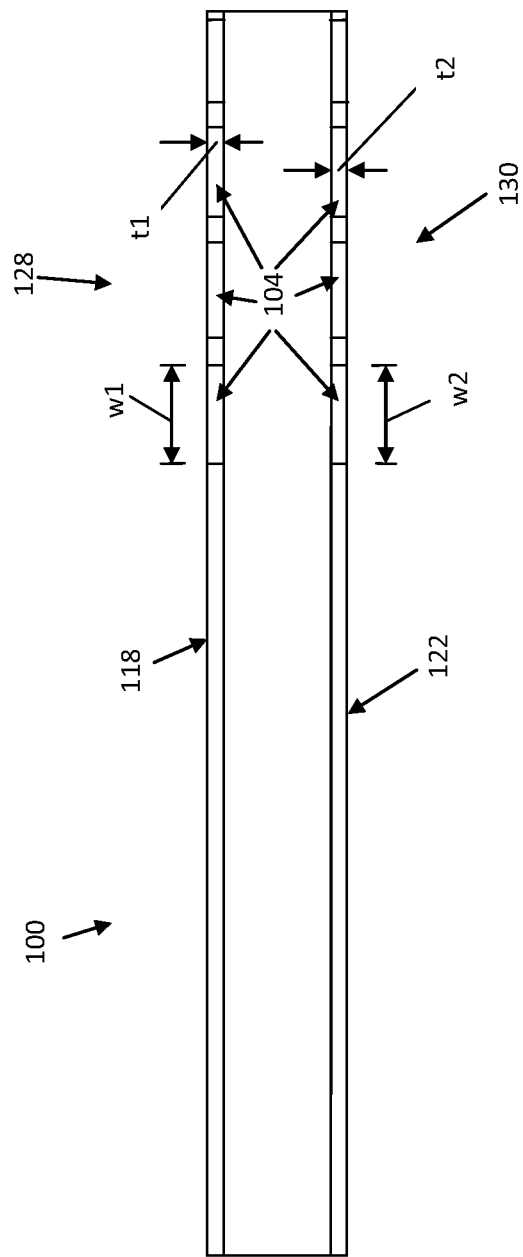
FIG. 3 is an end view, taken along line 3-3, of the device of FIG. 1.

FIG. 3 shows an embodiment of the side vents 104 of the system 100. First and second sets 128, 130 of side vents 104 may be provided adjacent upper and lower surfaces of the system 100. The first set 128 of air vents 104 may be disposed adjacent to the top air duct 112 and the second set 130 of vents may be disposed adjacent to the bottom air duct 114.

In some embodiments, the top air duct 112 may be in fluid communication with the first set 128 of side vents 104, while the bottom air duct 114 may be in fluid communication with the second set 130 of side vents 104. In other embodiments, each of the top and bottom air ducts 112, 114 may be supplied by a separate sets of side vents 128, 130 positioned at separate locations on the side surfaces 102 of the system 100. In other embodiments, the top and bottom air ducts 112, 114 are supplied by a single set of side vents 104.

Side vents 104 may have a width "w1" (for set 128) and a width "w2" (for set 130). In one embodiment, the width "w1," "w2" of the side vents 104 may be substantially greater than the thickness "t1," "t2" of the top and bottom air ducts 112, 114. In some embodiments, the thicknesses "t1," "t2" may be from about 1 millimeter to about 5 millimeters. In one non-limiting exemplary embodiment, the thicknesses "t1," "t2" is about 3 millimeters. In some embodiments, the side vents 104 have substantially the same thickness "t1," "t2" as the top and bottom air ducts 112, 114.

In some embodiments, the side vents 128, 130 are positioned on a portion of the system 100 opposite the air mover 106. In other embodiments, the side vents 128, 120 are positioned on a portion of the system adjacent to the air mover 106.

In operation, relatively cool air may be drawn through the top and bottom air ducts 112, 114 by the air mover 106. As this air moves through the ducts via flow paths 108, it may cool the user interface surfaces of the top and bottom air ducts (i.e., the upper surface 118 of the top air duct 112 and the lower surface 122 of the bottom air duct 114). Since this air flow 108 may also contact upper and lower surfaces of the central housing 110, this "first through" pass may provide some cooling of the heat-producing components contained in the central housing 110. The inlet air may pass into the air mover 106 and discharged into the central housing 110 along flow lines 116, where it may provide direct cooling of the heat-producing components in the housing. The heated air may then be expelled through one or more exhaust vents 111.

In some embodiments, this arrangement may maintain the user interface surfaces 118, 122 at only a few degrees Celsius (e.g., 2-3 degrees C.) higher than ambient temperature.

Figure 4:
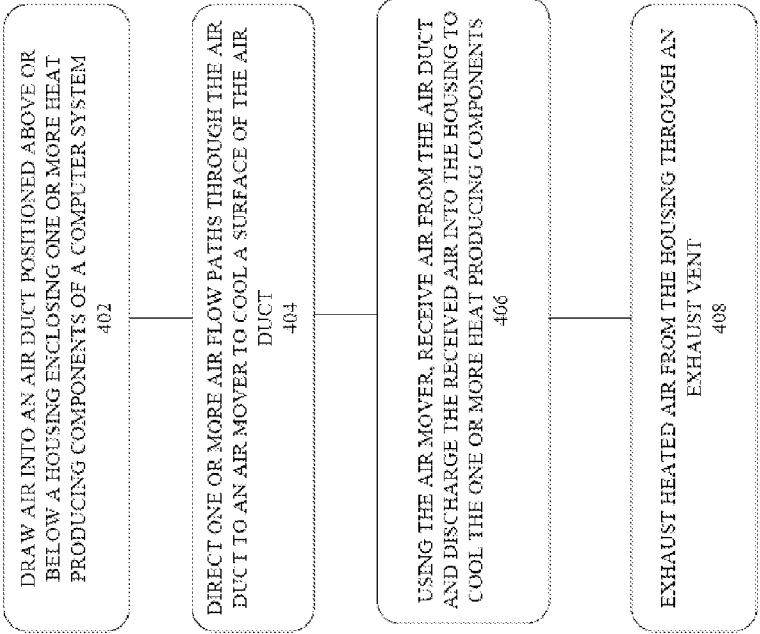
FIG. 4 illustrates a logic flow according to an embodiment.

FIG. 4 is a block diagram that illustrates an example of a process that may be used to cool computer systems, in accordance with some embodiments. At block 402, an air mover may be used to draw air into an air duct of a computer system. The air duct may be positioned above or below a central housing. The central housing may contain one or more heat producing components of the computer system, such as a processor, a hard drive, and optical drive, or the like. In one embodiment, a pair of air ducts may be provided. One air duct may be positioned above the central housing and a second air duct may be positioned below the central housing. Air may be drawn into the pair of air ducts through respective side vents positioned adjacent to the pair of air ducts. In one embodiment, the side vents may be positioned on a side of the system opposite that of the air mover. At block 404, the enclosure may be used to direct one or more air flow paths to the air mover, and in the process, the air flow may cool a surface of the air duct. Where the enclosure is a pair of air ducts, the air flow through the air ducts may cool an upper surface of the air duct positioned above the central housing and a lower surface of the air ducts positioned below the central housing. At block 406, the air mover may receive air from the air ducts and discharge the received air into the central housing to cool the one or more heat producing components located therein. At block 408, heated air may be exhausted through an exhaust vent.

It should be understood that embodiments may be used in a variety of applications. Although the embodiments are not limited in this respect, certain embodiments may be used in conjunction with many electronic devices, such as a personal computer, a desktop computer, a mobile computer, a laptop computer, a notebook computer, a tablet computer, a server computer, a network, a Personal Digital Assistant (PDA) device, a wireless communication station, a wireless communication device, a cellular telephone, a mobile telephone, a wireless telephone, a PDA device or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a housing to enclose a heat producing component therein, the housing arranged adjacent to a first air duct comprising a first opening and a second air duct comprising a second opening, the first air duct and the second air duct comprising separate air ducts to facilitate two or more separate airflows;
the first air duct arranged above the housing between the housing and a palm rest portion of the apparatus;
the second air duct arranged below the housing between the housing and a bottom portion of the apparatus; and
an air mover disposed at ends of the first and second air ducts opposite the first and second openings, the air moved disposed within the housing the air mover arranged to draw air in through both the first and second openings of the first and second air ducts and to discharge the air into the housing as an outlet wherein the first duct is angled or stepped to accommodate one or more platform level components, and wherein the first air duct has a substantially constant thickness.

2. The apparatus of claim 1, the first opening arranged on a side surface of the apparatus adjacent to the first air duct and the second opening arranged on a side surface of the apparatus adjacent to the second air duct.

3. The apparatus of claim 1, the first and second openings arranged on at least one of a top and bottom surface of the apparatus.

4. The apparatus of claim 1, the first duct arranged to cool a palm rest portion of the apparatus and the second duct arranged to cool a bottom portion of the apparatus.

5. The apparatus of claim 1, the first duct arranged to cool a top portion of the housing and the second duct arranged to cool a bottom portion of the housing.

6. A computer system, comprising:
a base portion having upper and lower surfaces;
a first air duct positioned adjacent to the upper surface of the base portion
a second air duct positioned adjacent to the lower surface of the base portion;
the first air duct having a first opening to facilitate airflow into the first air duct and the second air duct having a second opening to facilitate airflow into the second air duct, the first air duct and the second air duct comprising separate air ducts and the airflows comprising separate airflows;
a housing having a heat producing component therein, the housing positioned adjacent to and in between the first and second air ducts; and
an air mover disposed at ends of the first and second air ducts opposite the first and second openings, the air moved disposed within the housing the air mover arranged to draw air in through both the first and second openings of the first and second air ducts and to discharge the air into the housing as an outlet wherein the first duct is angled or stepped to accommodate one or more platform level components, and wherein the first air duct has a substantially constant thickness.

7. The computer system of claim 6, the first and second openings arranged on a side surface of the base portion adjacent to the first and second air ducts.

8. The computer system of claim 6, the first and second openings arranged on a side surface of the base portion opposite the air mover.

9. The computer system of claim 6, the first air duct arranged adjacent to a palm rest portion of the computer system and the second air duct arranged adjacent to a lap rest portion of the computer system.

10. The computer system of claim 6, the first duct arranged to cool a palm rest portion of the computer system and the second duct arranged to cool a bottom portion of the computer system.

11. The computer system of claim 6, the first duct arranged to cool a top portion of the housing and the second duct arranged to cool a bottom portion of the housing.

12. A method, comprising:
drawing air through first and second openings into first and second air ducts positioned adjacent to a housing containing one or more heat producing components of a computer system, the first air duct arranged above the housing and the second air duct arranged below the housing, the first air duct and the second air duct comprising separate air ducts;

directing two or more separate air flow paths through the first and second air ducts from the first and second openings to an air mover disposed within the housing adjacent to ends of the first and second air ducts opposite the first and second openings, the air flow to cool one or more of a surface of the first air duct and a surface of the second air duct;

at the air mover, receiving air from the first and second air ducts and discharging the received air into the housing to cool the one or more heat producing components in the housing; and exhausting heated air from the housing through an exhaust vent wherein the first air duct is arranged with an angled or stepped portion to accommodate one or more platform level components while having a substantially constant thickness.

13. The method of claim 12, drawing air into the first and second air ducts comprises drawing air through the first and second openings, the first and second openings positioned on a side surface of one or more of the first and second air duct.

14. The method of claim 12, the first duct arranged to cool a palm rest portion of the computer system and the second duct arranged to cool a bottom portion of the computer system.

15. The method of claim 12, the first duct arranged to cool a top portion of the housing and the second duct arranged to cool a bottom portion of the housing.

* * * * *

UNITED STATES PATENT AND TRADEMARK OFFICE
CERTIFICATE OF CORRECTION

PATENT NO.        : 8,953,313 B2                                         Page 1 of 1
APPLICATION NO.   : 12/890420
DATED             : February 10, 2015
INVENTOR(S)       : Mark MacDonald It is certified that error appears in the above-identified patent and that said Letters Patent is hereby corrected as shown below:

In the claims,

In column 7, line 14, in claim 12, delete "mo" and insert -- more platform level components while having a substantially constant thickness. --, therefor.

In column 7, line 15-16, in claim 13, after "and" delete "re platform level components while having a substantially constant thickness.".

Signed and Sealed this
First Day of December, 2015

Michelle K. Lee
*Director of the United States Patent and Trademark Office*